United States Patent [19]
Zeck et al.

[11] Patent Number: 6,020,979
[45] Date of Patent: Feb. 1, 2000

[54] METHOD OF ENCODING HIGH RESOLUTION EDGE POSITION INFORMATION IN CONTINUOUS TONE IMAGE INFORMATION

[75] Inventors: Norman W. Zeck, Webster; Thomas A. Henderson, Rochester, both of N.Y.

[73] Assignee: Xerox Corporation, Stamford, Conn.

[21] Appl. No.: 09/046,231

[22] Filed: Mar. 23, 1998

[51] Int. Cl.[7] .................................................. G06K 15/00
[52] U.S. Cl. ............................................. 358/1.9; 358/1.2
[58] Field of Search ..................................... 395/101, 102, 395/109, 112, 113, 114, 117; 382/175, 176, 180, 266, 267, 268, 269, 275; 358/530, 533, 534, 535, 536, 538, 540

[56] References Cited

U.S. PATENT DOCUMENTS

| | | | |
|---|---|---|---|
| 5,307,180 | 4/1994 | Williams et al. | 358/448 |
| 5,742,703 | 4/1998 | Lin | 382/176 |
| 5,778,156 | 7/1998 | Schweid | 382/176 |
| 5,778,160 | 7/1998 | Smith | 398/538 |

*Primary Examiner*—Arthur G. Evans
*Attorney, Agent, or Firm*—Mark Costello

[57] ABSTRACT

A method of encoding higher resolution edge information in lower resolution image information, so that the advantageous properties of both types of data can be used in binarization including the steps of receiving text/line art regions of the document image as binary pixels at a text/line art frequency selected to avoid aliasing effects at any edge pixels therein; receiving pictorial regions of the document image as continuous tone pixels, at a frequency lower than the text/line art frequency; applying an anti-aliasing filter to the text/line art regions, to replace some edge pixels with gray level pixels having M levels; converting the document image to a binary representation by converting each of the M levels in the text/line art regions to a binary representation reflecting correct edge position of the text/line art regions, and converting the contone pixels to a binary representation determined by a halftone pattern having N levels selected for the contone pixels.

8 Claims, 6 Drawing Sheets

METHOD OF ENCODING HIGH RESOLUTION EDGE POSITION INFORMATION IN CONTINUOUS TONE IMAGE INFORMATION

The present invention is directed to an image coding format that allows binary resolution-like placement of edges in continuous tone images, and more particularly, describes a format for including edge placement information to be embedded in continuous tone image information.

BACKGROUND OF THE INVENTION

The printing of high quality full intensity text and line graphics has requirements that in are conflict with the printing of pictures. For text, high spatial resolution is required to eliminate jaggies in diagonal lines and to form fine features of a font. In contrast, the printing of pictures requires many levels of intensity or gray, but is less demanding in terms of spatial resolution.

Images can be defined in a number of encoding formats, optimized for the particular use of the image in a system. Each format has advantages and disadvantages. As an example, within a printing system, images may appear in either of continuous tone format or binary format, where each format has its own resolution. For the purposes of the present application, continuous tone format is an image defined by image signals or pixels, each pixel having more than two possible intensity or gray levels. Relatively coarse resolutions are possible, because the image can utilize the plural intensity level format to add information to the image. The format is considered highly portable. Continuous tone images can also utilize look up tables for tone reproduction correction (TRC).

In binary format much of the portability is lost as both intensity (via halftoning) and edge positioning must be described by full on or off pixels. In this format, via halftoning, intensity levels of gray are reproduced by combinations of binary spots in patterns which are larger or smaller depending on intensity level. Halftone formats require a trade off between the number of intensity or gray levels which can be used, and the frequency of the halftone pattern, which tends to become more visible as the number of intensity levels increases. Halftones are represented with binary signals and cannot be TRC corrected. Halftones patterns and their use are tied to specific machines, and are not generally considered portable. It is undesirable to represent text and line art in halftones, since edges tend to assume a ragged appearance. Edges can be represented with the binary format, but must be represented at a higher resolution than the halftone dot frequency to maintain high quality.

In rendering images for a halftone output device such as a laser printer, there is a tradeoff made in edge position control and representing continuous tone levels via halftoning. Binary formats are used in halftoning to represent intensity levels, but at the resolution of the continuous tone input pixel and halftone dot. Both are typically much lower resolution than the binary addressability of the output device. The image quality for some objects is reduced by the introduction of "jaggy", staircase like edges that have to be rendered at the lower continues tone pixel or halftone dot resolution. This invention describes a technique for concurrently encoding the edge information with the continuous tone pixel so that edges can be placed at the higher binary output resolution.

Each of the above described formats may have different resolutions. The resolution of the continuous tone pixels may be defined as CONRES. The resolution or frequency of halftone dots in a halftoned image is defined as DOTRES. Lastly, there is the resolution of the binary output device defined as BINRES. For a typical printing system:

BINRES>CONRES>DOTRES

Figure 1:
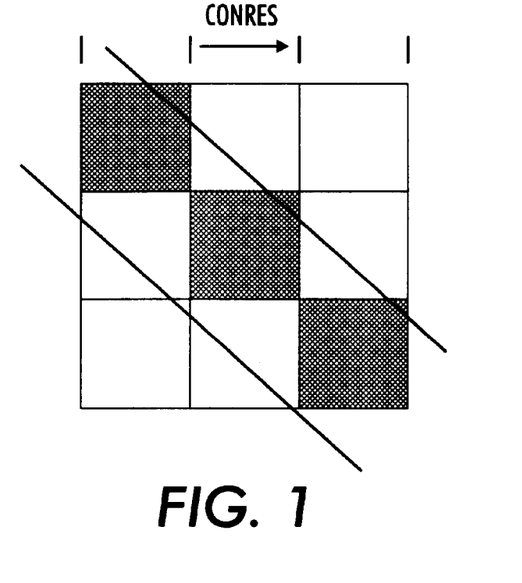
FIG. 1 shows a diagonal line exhibiting significant aliasing or jaggies.
Figure 2:
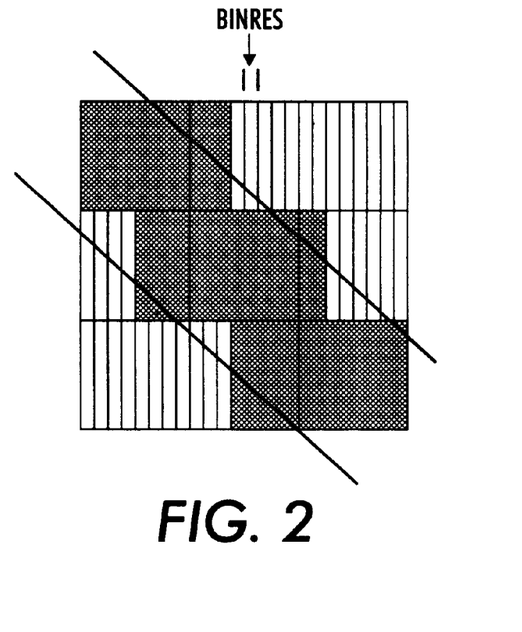
FIG. 2 shows a diagonal line reproduced at a higher resolution or higher addressability than the line of FIG. 1, with aliasing significantly reduced.

FIG. 1 shows the output obtained printing a saturated (non-halftoned) object at CONRES, where the output edges are "jaggy". This would be further reduced in quality (i.e., it would have more jaggies) if the object were not saturated and halftoned. In the halftone case, due to the dot resolution (DOTRES), edges are placed at the halftone dot frequency that is generally lower than CONRES. FIG. 2 shows how the higher resolution of the output device (in this example 8× in the fast scan direction) that is normally used to render intensity levels via halftoning can be used to improve the edge placement. The visual impact of the jaggies are significantly is reduced.

It would be highly desirable to combine the edge enhancing features of high resolution BINRES with the high data content of CONRES, and to encode images in such a format. Additionally, due to the problems associated with image in DOTRES, it would be desirable to avoid using halftones until the last possible point in an image path.

U.S. patent application Ser. No. 08/353,763 to Harrington et al, teaches that edge control can be accomplished in continuous tone image objects, by treating the edges as high resolution bitmaps having the same shade value as the rest of the image. This is, however, a description of an image operation, and not a coding format for an image.

U.S. Pat. No. 5,307,180 to Williams et al., describes a system in which particular bits of data in a transferred data byte instruct the system about its operation.

Alternate methods, such as the proprietary CT/LW encoding from Scitex, require two raster planes. One plane contains areas where tone is important, the other edge important. This method also requires an operation to merge the two planes before printing.

References herein are incorporated by reference for their teachings

SUMMARY OF THE INVENTION

In accordance with the invention, there is provided a method of encoding higher resolution edge information in lower resolution image information, so that the advantageous properties of both types of information may be used in reproduction of an image.

In accordance with one aspect of the invention there is provided a method of encoding higher resolution edge information in lower resolution image information, so that the advantageous properties of both types of data can be used in binarization including the steps of receiving text/line art regions of the document image as binary pixels at a text/line art frequency selected to avoid aliasing effects at any edge pixels therein; receiving pictorial regions of the document image as continuous tone pixels, at a frequency lower than the text/line art frequency; applying an anti-aliasing filter to the text/line art regions, to replace some edge pixels with gray level pixels having M levels; converting the document image to a binary representation by converting each of the M levels in the text/line art regions to a binary representation reflecting correct edge position of the text/line art regions, and converting the contone pixels to a binary representation determined by a halftone pattern having N levels selected for the contone pixels.

The invention solves the problem for using differing types of image information, by encoding high resolution binary edge information with low resolution continuous tone information in the image. The edges can be positioned at the highest output resolution, while maintaining a continuous tone representation of the image allowing tone reproduction adjustment at the output device. The method used by the invention encodes the image area where tone level is important in a large subspace of the digital address range of the pixel. A smaller space in the address range is used to encode the edge information. The output rendering function for the system will process the encoding, and appropriately generate an output document based thereon. It is advantageous that information about the image can be passed without a tag bit, or the overhead such extra data usually requires.

These and other aspects of the invention will become apparent from the following descriptions used to illustrate the preferred embodiment of the invention, read in conjunction with the accompanying drawings in which:

DETAILED DESCRIPTION OF THE INVENTION

Figure 3:
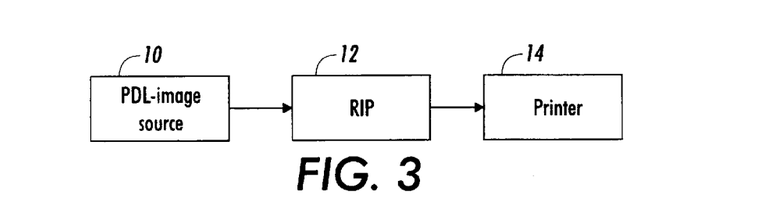
FIG. 3 shows a system in which the present invention might find use.

Referring now to the drawings where the showings are for the purpose of describing the embodiment of the invention and not for limiting same, reference is made to the FIG. 3 print system in which the present invention may find advantageous use.

In the present case, contone, continuous tone or gray image data may be characterized as image signals, each pixel of which is defined at a single level or optical intensity in a set of 'c' intensity levels, where 'c' is greater than 2. Preparatory to printing, each contone pixel will be processed in the manner described hereinbelow, to redefine such pixels in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a intensity between a minimum and a maximum. Accordingly, pixels are defined by intensity and position. In this context, we will describe pixels as discrete image signals, which represent optical intensity of the document image in a given small area thereof. "Gray", as used herein does not refer to a color unless specifically identified as such. Rather, the term refers to image signals which vary between maximum and minimum, irrespective of the color of the separation in which the signals are used. Color is given by using a set of pixels in a juxtaposed relationship, each pixel associated with a single colorant, and each combination of pixels for a single colorant represented electronically as a "separation".

FIG. 3 illustrates a source of images 10, which may conveniently be a source of PDL (Page Description Language) files which produces image signals defined in either RGB space for color images or intensity space for black and white images, providing images stored in continuous tone format. Other image sources are possible, provided that they can distinguish between text/line art and pictures. Images will be printed in binary format at printer 14. Images from source of PDL images must be processed at RIP (raster image processor) 12, prior to printing at printer 14, in order to properly prepare the images for printing.

Generally, the PDL-described image is independent of device resolution. Thus, lines and images are described in a manner which optimizes their reproduction. Preparatory to printing, however, a resolution "commitment" must be made at the RIP. However, it is important to note that the entire image does not have to be committed to the same resolution.

Figure 4A:
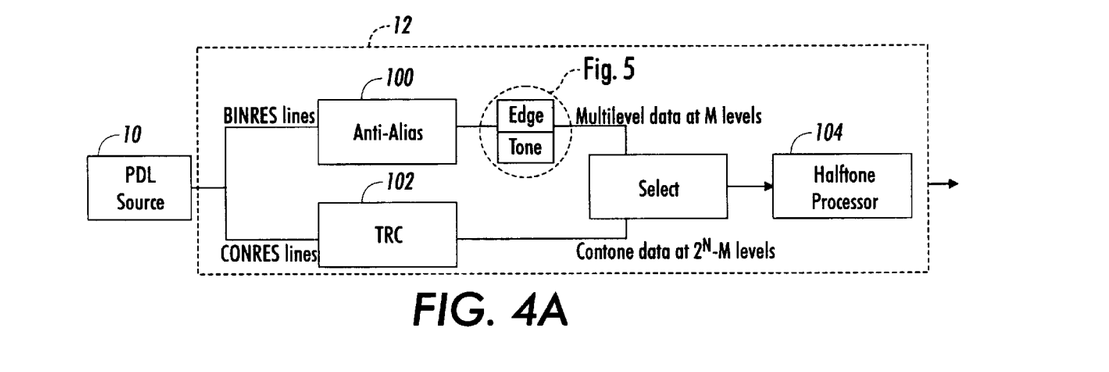
FIGS. 4A and 4B illustrate some of the basic elements that would be found in a system implementing the present invention.

With reference to FIG. 4A, within RIP 12 the PDL-described image has information about the content and nature of the image it contains, and can provide an initial description of the image with lines are high binary resolution (BINRES), and pictures at low contone resolution (CONRES). Thus, the output from the PDL-image source 10 can be both text/line art at BINRES and pictures at CONRES, which will be illustrated as separate lines of data, although the data may be passed along the same line.

With reference to FIG. 4A, by allowing images to remain in a contone format until that last possible time to halftone the image, TRC compensation of the images is possible. This function is desirable for printer process controls, and provides a control opportunity that is available only if the image remains encoded in a contone format. Another feature of TRC compensation is the ability to distribute the document for printing on other printers of similar characteristics. That is to say, since the printer can effectively correct images directed thereto, the documents, if generated in a contone format, can be printed correctly at any calibrated printer. This can be useful in a network/production printing environment to achieve load balancing, of for remote distribute-and-print services. Thus, document device independence is enhanced.

Referencing FIG. 4A, in portions of the image including text/line art, where edges of lines at BINRES are important, such as for example, a curved portion of an alphanumeric, the edges are antialiased typically by an anti-aliasing filtering operation 100. Sometimes, such 10 operations are implemented as convolution filters, or, as template matching filters, as illustrated, for example in U.S. patent application Ser. No. 09/219,705 to Loce et al. These edges are altered to reflect a number of gray levels that would be suitable to use in rendering the edges. Gray is substituted for some of the high frequency edge pixels, and the overall BINRES resolution is dropped to the same resolution as CONRES. However, the number of gray levels, call it M, used is typically small, compared to the number of levels used in rendering the image, and, in an example 8 bit system, might be between about 4–16 levels. For any N-bit system, M will be significantly less than $2^N$.

For TRC correction 102, each pixel in the contone image has an multi-bit value which is used as an address to a lookup table and mapped to an appropriate output value. In doing so, compensation or redistribution of the pixels values through the tonal range of the system is possible. As noted, in common systems, 256 levels are used, however, greater and lesser numbers of levels are also possible. However, in accordance with the invention, the contone images are mapped to a slightly smaller set of contone values, as will be further discussed below. In an N bit system example, contone values will be mapped to a range of $2^N$-M levels.

With the images antialiased, and TRC-corrected, halftoning immediately before printing is now desirable. While halftoning 104 can be performed as computed function of the input signals and appropriately selected halftone pattern signals, it may also be implemented as a lookup table function, where each contone value addresses an appropriate halftone conversion to a binary signal set, which forms the output halftone N-bit processing system, there would logically be $2^N$ locations in the lookup table. In the example, N=8, there will be 256 addresses. However, many useful halftone dots have less than 256 levels. In fact, the human eye has difficulty in distinguishing 256 levels of gray, except under extraordinary circumstances.

Figure 5:
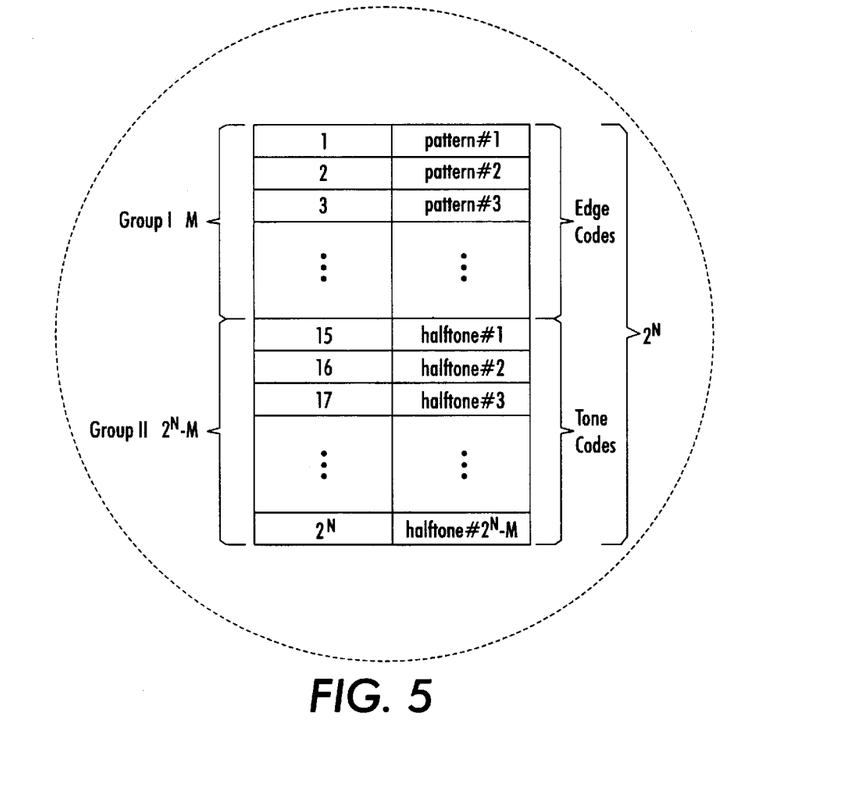
FIG. 5 illustrates the organization of the halftoner look up table.

In accordance with another aspect of the invention, and with reference to FIG. 5, a portion of the addresses, M values out of the $2^N$ levels, are reserved for edge rendition, as will be further discussed. The remaining $2^N$-M levels are used for halftone rendition. In doing so, two groups of output values are established: Group I, for contone values to be rendered acceptably at the equivalent of a low resolution, and Group II, for values added in anti-aliasing operations, which must be rendered at a relatively high resolution.

Figure 6:
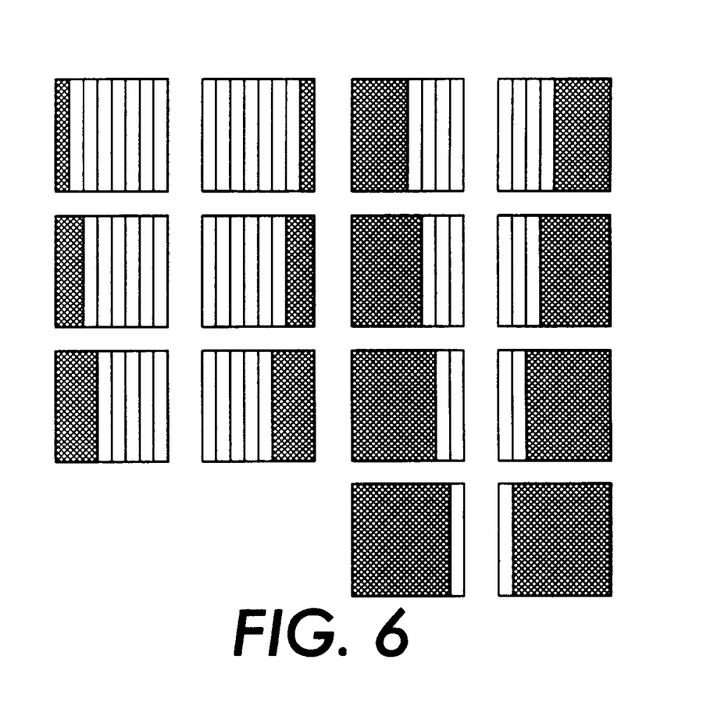
FIGS. 6, 7 and 8 show possible edge patterns for use in place of gray level anti-aliasing pixels.
Figure 7:
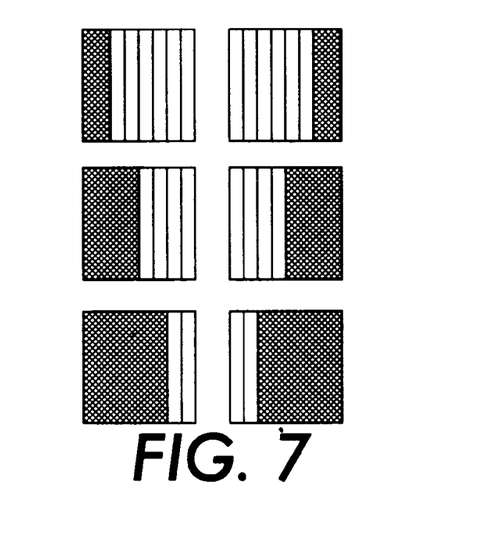
Figure 8:
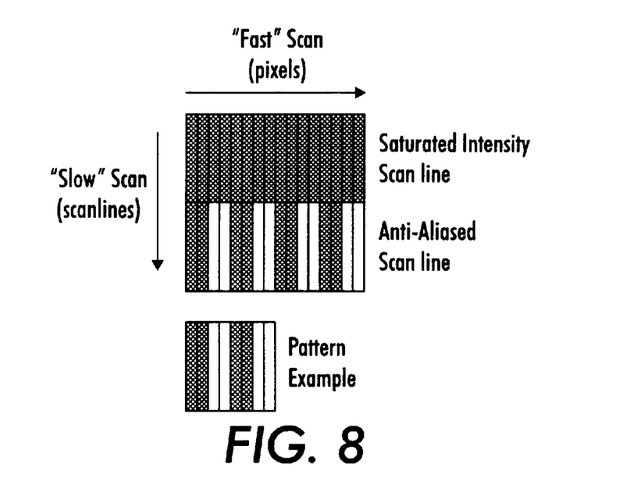

The output of the look up table is a reference to a pattern, either directly or through a pointer arrangement, which tells the printer what binary pattern to print. For Group II values, the output will be related to the halftone pattern selected, given the contone value at the input. For Group I values, the output will be an edge rendition pattern, such as those illustrated at FIGS. 6, 7 and 8. The patterns of FIGS. 6, 7 and 8 are generated using high addressability printing capability, to place an edge at one of several possible positions within a single pixel at in an edge in the image. In one example, assuming that addressability is approximately 8×8 pixel resolution, the edge can be placed in any of the 14 different positions of FIG. 6, allowing 7 positions for a leading edge, and 7 positions for a trailing edge. It is empirically determined, however, that that amount of precision in edge placement may not be required. Accordingly, FIG. 7 illustrates a set of edge patterns, still at 8× pixel resolution, where the edge can be placed in any of the 6 different positions.

Addressability and resolution are still somewhat process dependent, and while high resolution and addressability can be obtained in the fast scan direction of a printer relatively inexpensively, it is much more expensive to obtain the functionality in the slow scan direction of the printer (along the process direction). This means that while edge placement can be carefully controlled in the cross process direction, it is more difficult to control in the process direction of any printer. However, the principle of anti-aliasing still works to some extent in the process direction, and an anti-aliasing effect can be obtained by printing scan lines with intervals related to the percentage of a pixel width in the process direction. Thus, as illustrated in FIG. 8, by printing 50% of the high resolution pixels in the fast scan direction, with an "ON/OFF" pattern, an effect can be obtained that is integrated by the eye to an edge placed at approximately the ½ pixel position. If this effect is desired, it must be included in the set of patterns that can be used for antialiased pixels. Combination patterns representing combine fast scan and slow scan patterns, combined, are possible, and would tend to be process dependent, as are the process direction patterns.

Figure 9:
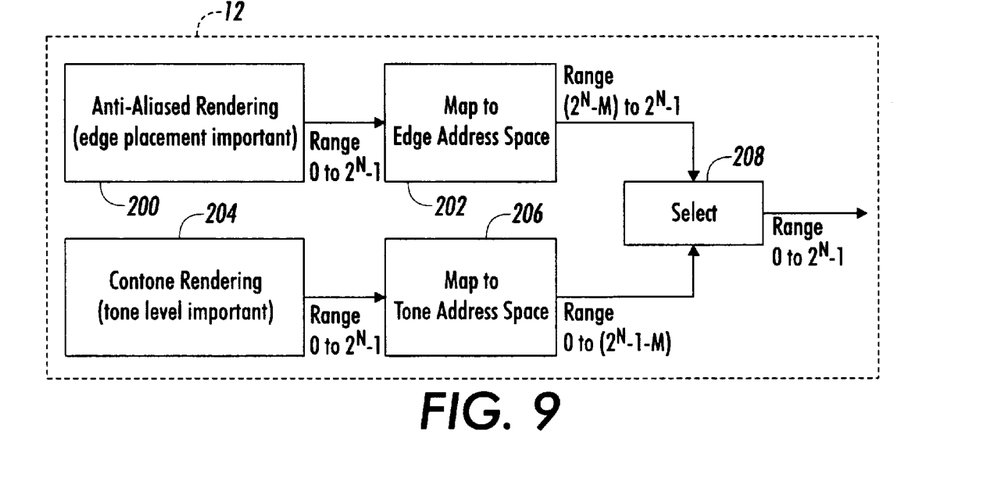
FIG. 9 is functional view of the principle of operation of the invention.

FIG. 9 represents the principle of the invention. Implemented at RIP 12, pixels in areas in which anti-aliased rendering will take place (block 200), and edge placement is important, will be mapped to edge address space (block 202), outputting one of M possible values. Pixels in areas in which contone rendering will take place, and tone level rendition is important (block 204), will be mapped to tone address space (206), outputting one of $2^N$-M values. A process for combining the two image sets is provided at select function 208.

Figure 4B:
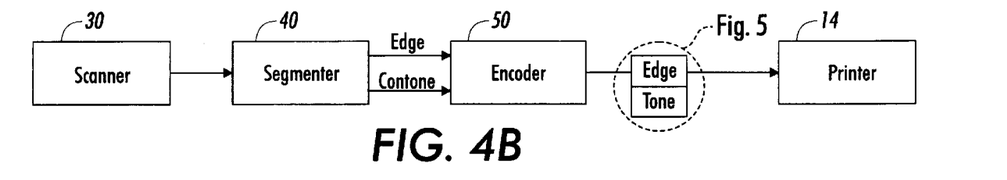

In FIG. 4B, a slightly different embodiment is illustrated, based on scanned image input. Accordingly, scanner 30 directs image data to a segmenter 40, which identifies image types within the scanned image data, including requirements for edges, halftones, continuous tones, etc. With this information thus available, the segmenter can be used to generate the previously described data format, in which contones are described at a number of levels less that 256, and the remaining levels are used to describe more accurate edge representations for the data at encoder 50, using the segmenter information about the image. This information is then available for use at a printer 14, in much the same way as previously described.

Figure 10:
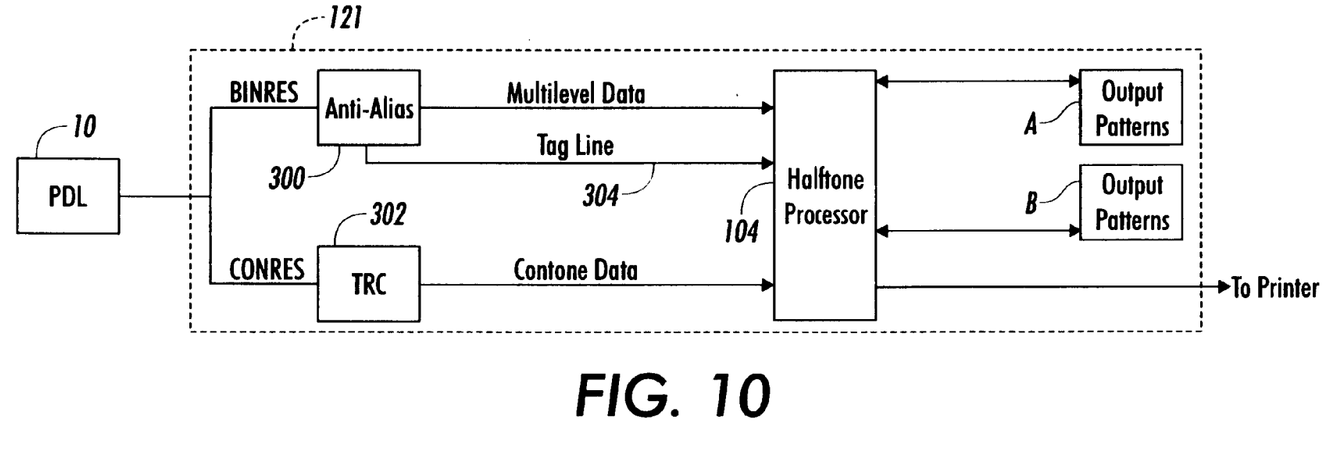
FIG. 10 provides an example where the invention is used in conjunction with a tag bit line.

With reference now to FIG. 10, until now an embodiment has been discussed in which no extra data lines are required, because the differentiation in text/line data requiring anti-aliasing and contone data to be halftoned, is inherent in the data itself. It is, of course, well within the scope of the present invention to provide an extra data line, created within the RIP, responsive to requirements in image processing, to differentiate between text/line data requiring anti-aliasing and contone data to be halftoned. Thus, in FIG. 10, image files from PDL 10 are directed to RIP 12', wherein the images are processed as BINRES images or CONRES images, respectively at anti-aliasing processor 300 or TRC processor 302. Whenever anti-aliasing process 300 operates, it generates a signal indicative of such operation on TAG bit line 304, which is directed to halftone processor 104'. In this scenario, halftone processor operates on the BINRES and CONRES data directed thereto based on the presence of absence of the TAG bit on TAG bit line 304. Such operation may cause the halftoner to use different sets of output patterns, for example A & B, one optimized for regions of high detail, and the other optimized for regions of low detail.

It will certainly be appreciated that, since exactness of edge rendition is important, antialiased regions should not be subjected to lossy compression, since it is unlikely that they can be returned to the correct state. Accordingly, in the event that the image is compressed, the anti-aliasing indication can be used to indicate that lossless compression should be used.

It will no doubt be appreciated that the present invention may be accomplished with either software, hardware or combination software/hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. In a printing system, receiving document images including both text/line art regions, and pictorial regions, a method for optimizing tonal and edge rendition including:

receiving text/line art regions of the document image as binary pixels at a text/line art frequency selected to avoid aliasing effects at any edge pixels therein;

receiving pictorial regions of the document image as continuous tone pixels, at a frequency lower than said text/line art frequency;

applying an anti-aliasing filter to said text/line art regions, to replace some edge pixels with gray level pixels having a first number of levels M;

converting said document image to a binary representation thereof;

converting each of said M levels in said text/line art regions to a binary representation reflecting correct edge position of said text/line art regions; and converting said contone pixels to a binary representation determined by a halftone pattern having N levels selected for said contone pixels, whereby information about the presence of text/line art regions and pictorial regions is passed without a tag bit.

2. The method as described in claim 1 where N is much larger than M.

3. The method as described in claim 1, wherein for a system using L bits of information, $M+N=2^L$.

4. The method as described in claim 1, wherein, prior to said converting step, said continuous tone pixels are tone corrected, to account for a particular system, said tone correction outputting N output levels.

5. In a printing system, receiving document images including both text/line art regions, and pictorial regions, a method for optimizing tonal and edge rendition, and carrying optimizing information with the document image, comprising:

receiving text/line art regions of the document image as binary pixels at a text/line art frequency selected to avoid aliasing effects at any edge pixels therein;

receiving pictorial regions of the document image as continuous tone pixels, at a frequency lower than said text/line art frequency;

applying an anti-aliasing filter to said text/line art regions, to replace some edge pixels therein with gray level pixels having a first number of levels M selected to optimally reproduce said edge pixels;

converting said document image including continuous tone pixels and gray level pixels to a binary representation thereof using one of L possible binary patterns, including M patterns representing binary edge placement patterns and N patterns representing binary gray reproduction patterns, including:

converting each of said M levels, in said text/line art regions to a binary representation selected from said M patterns reflecting correct edge position of said text/line art regions; and converting said contone pixels to one of said N binary representation determined by a halftone pattern having N levels selected for said contone pixels.

6. The method as described in claim 5, where N is much larger than M.

7. The method as described in claim 5, wherein $M+N=2^L$.

8. The method as described in claim 5, wherein, prior to said converting step, said continuous tone pixels are tone corrected, to account for a particular system, said tone correction outputting N output levels.

* * * * *